US009030923B2

(12) United States Patent
Hinkle et al.

(10) Patent No.: US 9,030,923 B2
(45) Date of Patent: May 12, 2015

(54) POWER AND CONNECTIVITY AWARE SWITCH

(75) Inventors: Lee B. Hinkle, Houston, TX (US); Kent E. Biggs, Tomball, TX (US); Michael A. Provencher, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 13/522,468

(22) PCT Filed: Apr. 1, 2010

(86) PCT No.: PCT/US2010/029547
§ 371 (c)(1),
(2), (4) Date: Jul. 16, 2012

(87) PCT Pub. No.: WO2011/123126
PCT Pub. Date: Oct. 6, 2011

(65) Prior Publication Data
US 2012/0287774 A1    Nov. 15, 2012

(51) Int. Cl.
*H04L 12/54*  (2013.01)
*H04L 12/40*  (2006.01)
*H04L 29/14*  (2006.01)

(52) U.S. Cl.
CPC ...... *H04L 12/5692* (2013.01); *H04L 12/40045* (2013.01); *H04L 69/40* (2013.01)

(58) Field of Classification Search
None
See application file for complete search history.

(56) References Cited

U.S. PATENT DOCUMENTS

| 7,294,940 | B2* | 11/2007 | Grolnic et al. | 307/66 |
| 7,839,771 | B2* | 11/2010 | Zeng et al. | 370/225 |
| 2005/0089052 | A1* | 4/2005 | Chen et al. | 370/401 |
| 2006/0083186 | A1* | 4/2006 | Handforth et al. | 370/310 |
| 2007/0054618 | A1* | 3/2007 | Lewis et al. | 455/41.2 |
| 2008/0294917 | A1* | 11/2008 | Khan et al. | 713/310 |

FOREIGN PATENT DOCUMENTS

| JP | 2007-158418 A | 6/2007 |
| KR | 20-2000-0014196 U | 7/2000 |
| KR | 10-2008-0004169 A | 1/2008 |
| KR | 10-0811491 B1 | 3/2008 |

OTHER PUBLICATIONS

International Search Report and the Written Opinion of the International Search Authority. Date of Mailing Jan. 3, 2011. International Application No. PCT/US2010/029547. Filing Date Apr. 1, 2010.

* cited by examiner

*Primary Examiner* — Brian Roberts
(74) *Attorney, Agent, or Firm* — Kraguljac & Kalnay LLC

(57) ABSTRACT

Systems, methods, and other embodiments associated with providing uninterrupted electrical power and data communications are described. One example method includes detecting primary electrical power loss to a network switch, and/or a loss of wired Internet connectivity to the network switch. The example method may also include controlling a backup power source to provide secondary electrical power to the network switch, and controlling a wireless access point to provide wireless Internet connectivity to the network switch.

20 Claims, 4 Drawing Sheets

POWER AND CONNECTIVITY AWARE SWITCH

BACKGROUND

Ensuring uninterrupted electrical power and data communications is critical to the success of many businesses. To complete a transaction, a business may use several different systems. Some of the systems may be at the business location while other systems may require communication with entities outside the business location. The inability to use a system involved in completing a transaction, or a disruption in communication with the outside entities, may prevent the business from completing transactions. Inability to complete a transaction may lead to the loss of that transaction, as a customer who is unable to purchase the desired good or service may decide to go elsewhere or decide not to make a purchase. The business may attempt to complete transactions with customers in spite of its inability to use certain systems or communicate with outside entities. If the attempted transactions fail to complete, though, the business may be unable to complete the attempted transactions once system access and communications return to normal. For example, the business may not be able to verify a customer's payment, preventing the business from receiving payment for delivered goods or services. Thus, ensuring uninterrupted electrical power and data communications increases a business's ability to complete transactions.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Systems, methods, and other embodiments that ensure continuity of electrical power supply and communications (e.g., voice, data) to devices employed to perform a transaction are described. Businesses use a variety of systems to complete a customer transaction. The systems used to complete a transaction may be at a business location or outside the business location. Examples of internal systems include credit card readers or electronic registers, while an example external system is a credit card verification system operated by an electronic payment processor. One aspect shared by systems used to complete a transaction is the need for continuous electrical power. Continuity of electrical power at a particular location may be ensured through the use of an uninterruptable power supply (UPS). While a UPS can provide a point source of continuous electrical power, other issues may need to be resolved to enable a business to successfully complete transactions in the event of a loss of main electrical power to its location. For example, if the UPS is to permit continued transaction processing by the business, secondary electrical power from the UPS can be distributed to those devices used for transaction processing. Also, since successful completion of a transaction for a business likely requires the use of systems not located at the business's location, data communications also should be available continuously, regardless of whether primary electrical power is available.

Figure 1:
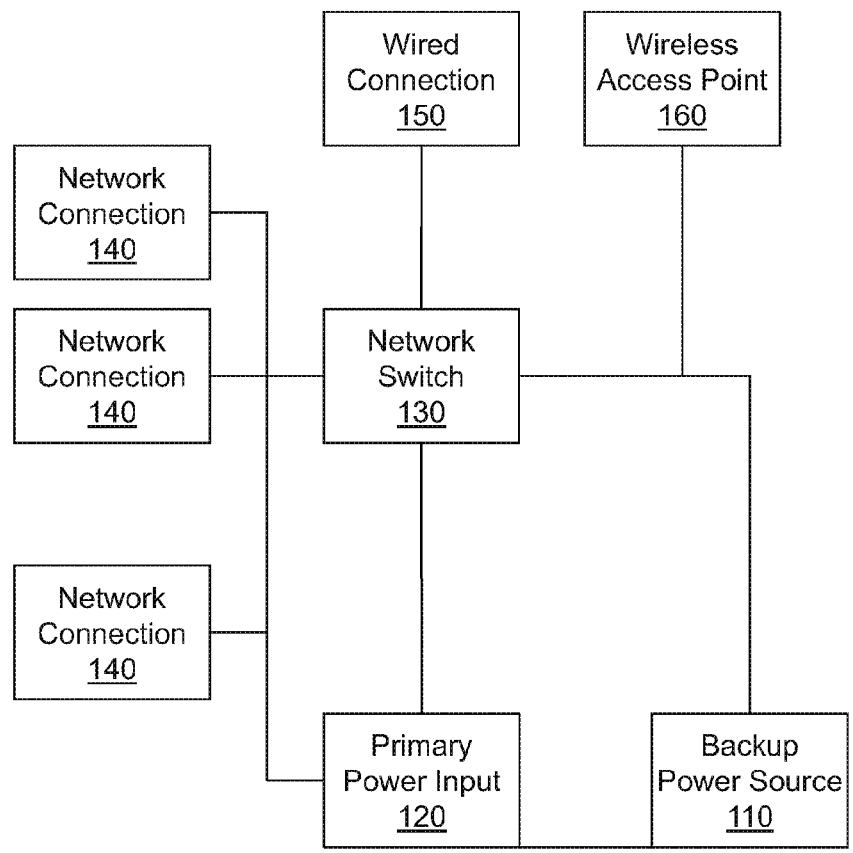
FIG. 1 illustrates an embodiment of an apparatus associated with ensuring continuity of electrical power supply and communications to devices employed to perform a transaction.

FIG. 1 illustrates an embodiment of an apparatus that incorporates a backup power source 110 to provide secondary electrical power upon loss of primary electrical power to a primary power input 120. The backup power source 110 provides secondary electrical power to elements of the apparatus that under normal conditions would derive their electrical power from the primary power input 120. These elements include a network switch 130 that is coupled to network connections 140. Network switch 130 provides connectivity between devices attached to network connections 140 and a wide-area network (e.g., the Internet). Thus, the network switch 130 also is coupled to wired Internet connection 150. The wired Internet connection 150 may be, for example, a connection to an integrated services digital network (ISDN), digital subscriber line (DSL), or cable modem. The wired Internet connection 150 permits data connections between internal devices connected to the network switch 130 and external systems accessible over the Internet. The wired Internet connection 150 may also provide voice connectivity using, for example, Voice over Internet Protocol (VoIP). The wired Internet connection 150 need not include a physical wire directly connected to the network switch 130. For example, the network switch 130 could communicate wirelessly with another device that is connected directly by a physical wire to an Internet connection. In this configuration the network switch 130 would transmit and receive data wirelessly, the connection to the Internet from the location where the UPS 100 is used would be a wired connection. The wireless communication could also support voice connectivity.

The network switch 130 also is coupled to wireless access point 160. Wireless access point 160 allows devices connected to network switch 130 to communicate over one or more wireless networks. The wireless networks may include wireless wide area networks (WWAN) (e.g., 2G, 2.5G, 3G, 4G) or wireless metropolitan area networks (WMAN) (e.g., Worldwide Interoperability for Microwave Access, or WiMAX). The communications may be data and/or voice communications. As with wired Internet connection 150, communications between the wireless access point 160 and the WWAN or WMAN networks may take place directly or indirectly. Indirect communications between the wireless access point 160 and a WWAN or WMAN network could, for example, involve the wireless access point 160 communicating over a wireless local area network (WLAN) (e.g., Wi-Fi) to a separate device that is in communication with a WWAN or WMAN. In this configuration, the connection to the Internet from the location where the UPS 100 is used would be a wireless connection.

Figure 2:
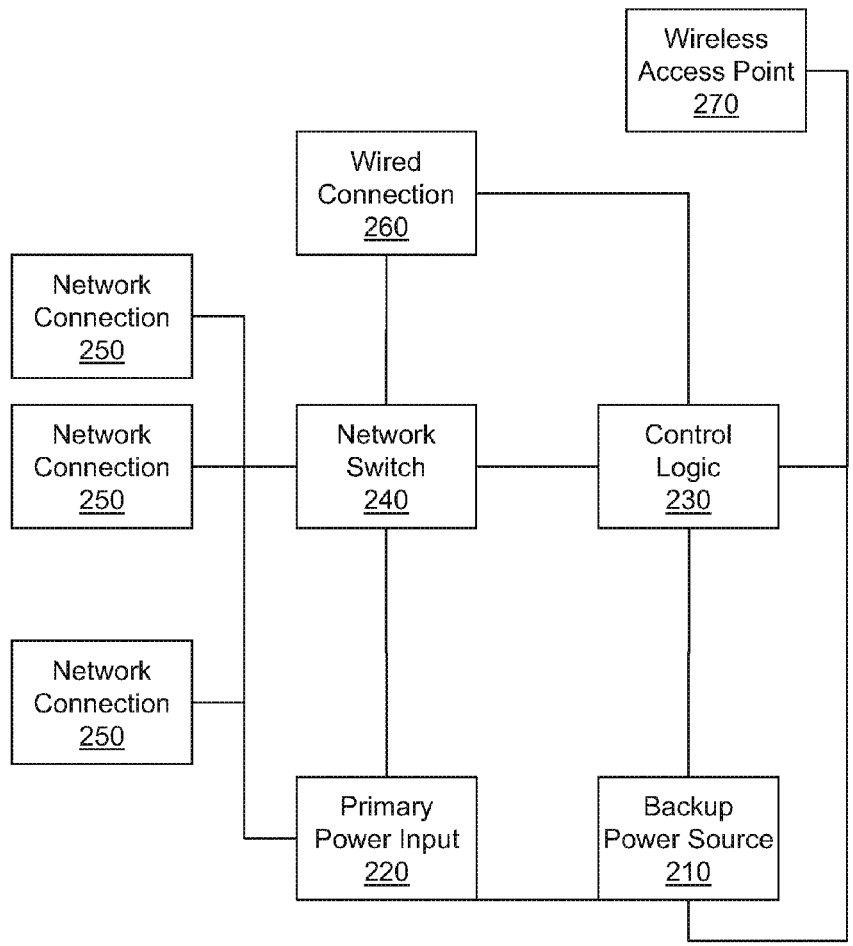
FIG. 2 illustrates another embodiment of an apparatus associated with ensuring continuity of electrical power supply and communications to devices employed to perform a transaction.

FIG. 2 illustrates an embodiment of an apparatus that includes a backup power source 210 that provides secondary electrical power upon occurrence of a loss of primary electrical power at a primary power input 220. Upon a loss of primary electrical power at primary power input 220, a control logic 230 detects the loss of primary electrical power and causes secondary electrical power from backup power source 210 to be provided to a network switch 240. Also, network switch 240 may provide electrical power to devices connected to network connections 250. Power over Ethernet (PoE) standards describe methods for providing direct current power over Ethernet cables concurrently with transmitted data. Thus, in one example, the power provided may conform to PoE standards. Therefore devices attached to network switch 240 through network connections 250 may function with a single connection, rather than requiring separate connections for electrical power supply and data transmission. Control logic 230 also may detect a loss of wired Internet connectivity through a wired Internet connection 260, in which case control logic 230 causes wireless Internet connectivity to be provided to network switch 240 via a wireless access point 270.

For a business to complete a transaction, it often is necessary for the business to process a credit card payment. If the processing cannot be done at the time of the transaction, the business risks having the payment declined at a later time. If a payment is declined, the business may be unable to collect payment for goods or services already delivered. Processing the credit card payment at the time of the transaction relies on proper functioning of devices operated at the business's location (e.g., credit card readers). Payment processing also relies on communications with external systems that verify aspects of the transactions. The external systems include systems operated by an electronic payments processor to verify credit-card payments. Thus, both electrical power and data connectivity at the business's location facilitate processing credit card payments. If either or both are lost, processing can be delayed or impossible, resulting in potential lost revenue for the business. Therefore, systems and methods to ensure uninterrupted electrical power and data connectivity are critically important to many businesses.

To ensure uninterrupted electrical power, a backup source of electrical power may be employed. For example, if the primary electrical power provided at primary power input 220 is a nominal 120 volts of alternating current supplied by an electrical cable connection, the backup power source 210 could be a rechargeable battery capable of supplying a nominal 48 volts of direct current to the devices (e.g., network switch 240) that normally would derive their electrical power supply from primary power input 220. If control logic 230 detects that the primary electrical power has been interrupted or cannot supply the minimum power needed for proper function of connected devices, control logic 230 can direct that secondary electrical power from backup power source 210 be supplied to the connected devices until primary electrical power is restored.

Ensuring uninterrupted data connectivity is accomplished in a similar manner. For example, if wired Internet connectivity is supplied by an Ethernet cable connecting wired Internet connection 260 to a cable modem, backup data connectivity could be provided by a connection to a WMAN (e.g., a WiMAX network) through wireless access point 270. Thus, if control logic 230 detects that wired Internet connectivity has been interrupted or cannot provide the minimum data throughput necessary to successfully complete transactions, then control logic 230 can direct that data transmissions flow to the wireless access point 270 rather than to the wired Internet connection 260. The backup sources ensure that transactions may be processed even if a business location has lost primary electrical power and wired Internet connectivity. Thus, even if wires serving the business location are severed accidentally or there is widespread loss of wired services in the event of a natural disaster, a business may continue to complete transactions. This continued functionality may prove especially important in the event of a natural disaster that leads to widespread loss of electrical power or wired Internet connectivity. If businesses are unable to complete transactions in those circumstances, people living through the natural disaster may be denied access to important goods, including water sold by a grocery store, clean-up equipment sold by a hardware store, or repair items sold by a home improvement store. Similarly, even if a restaurant were able to continue to prepare and serve food, an inability to complete transactions could prevent the restaurant from providing food to its customers. As another example, gas stations employ electronic systems to sell gasoline, and many sales are paid for with credit or debit cards. If people were unable to purchase gasoline due to widespread outages of power or wired Internet connectivity, they potentially could be unable to evacuate from the path of a natural disaster.

Figure 3:
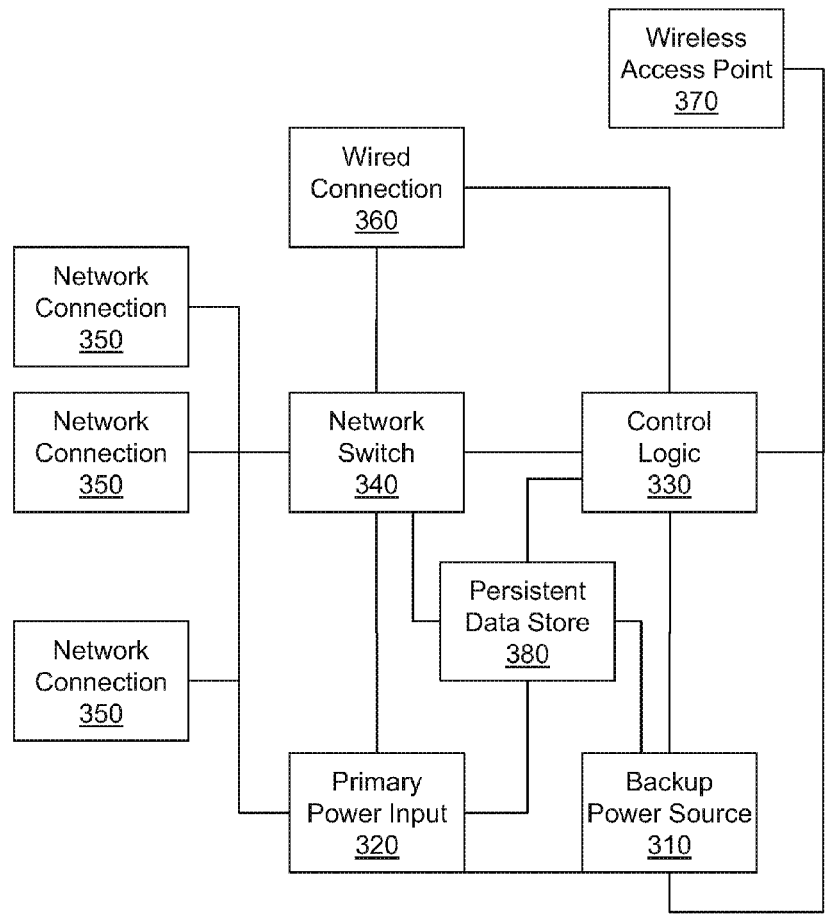
FIG. 3 illustrates an embodiment of an apparatus associated with ensuring continuity of electrical power supply and communications to devices employed to perform a transaction and for persistently storing data related to transactions.

FIG. 3 illustrates an embodiment of an apparatus that includes a backup power source 310 that provides secondary electrical power upon loss of primary electrical power at primary power input 320. Upon loss of primary electrical power at primary power input 320, control logic 330 detects the loss of primary electrical power and causes secondary electrical power from backup power source 310 to be provided to network switch 340. Network switch 340 may provide electrical power to devices connected to network connections 350. Control logic 330 also detects loss of wired Internet connectivity through wired Internet connection 360 and causes wireless Internet connectivity to be provided to network switch 340 via wireless access point 370. A persistent data store 380 may store data related to transactions processed by a business. A business may wish to ensure only that a minimal amount of transaction processing takes place in the event that one or both of primary electrical power and wired Internet connectivity are lost. For example, transaction processing by a business might normally include updating an inventory database or a customer relationship management (CRM) system. Performing these tasks would require additional electrical power and data connectivity beyond what is necessary to ensure payments are processed. Performing these tasks using backup sources for electrical power or data connectivity could place too much strain on the backup resources and limit the business's ability to continue to process transactions during an extended outage of one or both services. Thus, when processing transactions while using backup sources for electrical power or data connectivity, the business may decide to store data related to the transactions in persistent data store 380. Control logic 330 also may, upon detection of a loss of primary electrical power or loss of wired Internet connectivity, direct that data be stored in persistent data store 380. Data stored in persistent data store 380 may be retrieved once primary electrical power and wired Internet connectivity are restored. The business then can perform additional processing tasks on the data, already having ensured payment for goods and services at the time the transaction was completed.

Some portions of the detailed descriptions below are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 4:
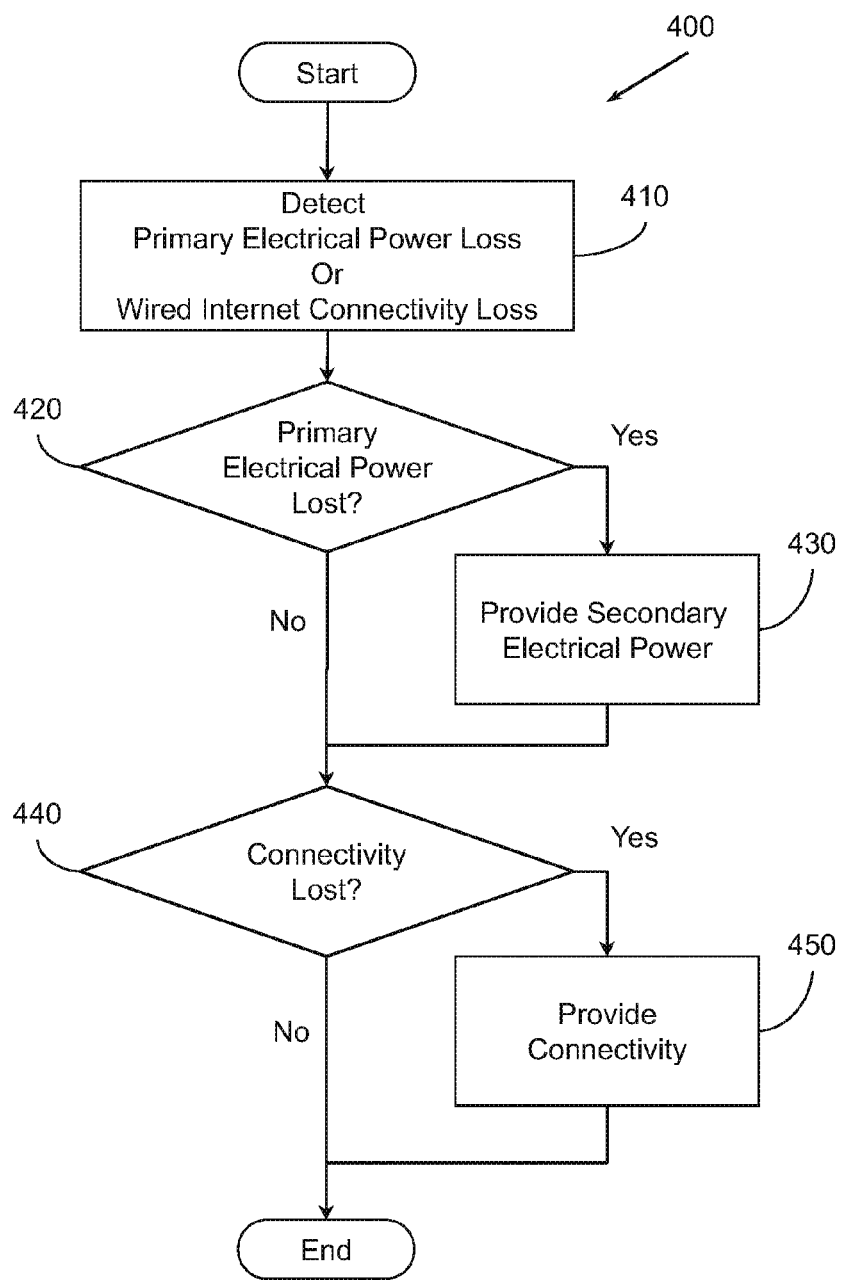
FIG. 4 illustrates an embodiment of a flowchart depicting an example method associated with ensuring continuity of electrical power supply and communications to devices employed to perform a transaction.

FIG. 4 illustrates an embodiment of a method 400 associated with providing continuous electrical power and communications to devices employed to perform a transaction. Method 400 may include, at 410, detecting a loss of primary electrical power or a loss of wired Internet connectivity. Detection of a loss of primary electrical power or a loss of wired Internet connectivity may be performed by a control logic configured to determine if one or both are lost. At 420, the control logic determines whether primary electrical power has been lost. If primary electrical power has been lost, then the control logic controls a backup power source to provide secondary electrical power to a network switch, as shown at 430. For example, the control logic could cause a rechargeable battery to provide electrical power to the network switch, thus permitting the network switch to continue to operate. The network switch also may be capable of providing electrical power to devices connected to the network switch. One example of providing electrical power to devices connected to the network switch is providing direct current conforming to Power over Ethernet (PoE) standards via a network connection. While PoE is described, one skilled in the art will appreciate that in some examples power not conforming to PoE may be provided. The secondary electrical power provided from the rechargeable battery could permit the network switch to continue to provide PoE-compliant or other power to devices connected to the network switch. At 440, the control logic determines whether wired Internet connectivity has been lost. If wired Internet connectivity has been lost, then at 450, the control logic controls a wireless access point to provide wireless Internet connectivity to the network switch. For example, if a DSL connection that had been providing wired Internet connectivity stops functioning, the control logic could cause a WiMAX access point to provide wireless Internet connectivity to the network switch. The availability of wireless Internet connectivity over the WiMAX network could permit the network switch to continue to send and receive data.

While FIG. 4 illustrates various actions occurring in serial, it is to be appreciated that various actions illustrated in FIG. 4 could occur substantially in parallel. By way of illustration, a first process could detect a loss of primary electrical power and a second process could detect a loss of wired Internet connectivity. While two processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes detecting a loss of primary electrical power or detecting a loss of wired Internet connectivity. While executable instructions associated with the above method are described as being stored on a computer-readable medium, it is to be appreciated that executable instructions associated with other example methods described herein may also be stored on a computer-readable medium.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An apparatus, comprising:
   a backup power source to provide secondary electrical power to a network switch upon occurrence of a loss of primary electrical power to the apparatus,
   the network switch being configured to provide electrical power through a network connection to one or more devices employed to perform a transaction; and
   a wireless access point to provide wireless Internet connectivity sufficient to verify a payment for the transaction to the network switch upon occurrence of a loss of wired Internet connectivity and a loss of primary electrical power; and
   a persistent data store to store data related to the transaction.

2. The apparatus of claim 1, where the electrical power provided to the one or more devices conforms to Power over Ethernet (PoE) standards.

3. The apparatus of claim 1, comprising:
   a control logic to detect one or more of, the loss of primary electrical power, and the loss of wired Internet connectivity, and to control the apparatus to provide to the network switch one or more of, secondary electrical power, voice connectivity, and wireless Internet connectivity.

4. The apparatus of claim 1, where the wireless access point communicates via one or more of, a Wireless Metropolitan Area Network (WMAN), and a Wireless Wide Area Network (WWAN) and where the wireless access point provides a reduced throughput sufficient to, verify a payment for the transaction.

5. The system of claim 1, wherein the network switch provides electrical power through a network connection to a credit card reader.

6. The system of claim 1, wherein the network switch provides electrical power through a network connection to an electronic register.

7. A method, comprising:
   detecting a loss of primary electrical power to a network switch and a loss of wired Internet connectivity to the network switch;
   controlling a backup power source to provide secondary electrical power to the network switch, a voice connectivity logic to provide voice connectivity, and a wireless access point to provide wireless Internet connectivity to the network switch; and
   verifying a transaction while primary electrical power is lost and wired Internet connectivity is lost;
   where the network switch is configured to provide electrical power through a network connection to one or more devices employed to perform the transaction,
   where a control logic detects the loss of primary electrical power to a network switch and the loss of wired Internet connectivity to the network switch, and
   where the control logic controls the backup power source and the wireless access point.

8. The method of claim 7, comprising:
   storing data related to the transaction in a persistent data store.

9. The method of claim 7, where the wireless access point is configured to communicate via one or more of, a Wireless Metropolitan Area Network (WMAN), and a Wireless Wide Area Network (WWAN) and where the wireless access point is configured to provide a reduced throughput sufficient to verify a payment for the transaction.

10. The method of claim 7, where the electrical power provided to the one or more devices conforms to Power over Ethernet (PoE) standards.

11. The method of claim 7, comprising:
    reducing the arrant of transactions that occur while primary electrical power is lost and wired Internet connectivity is lost.

12. The method of claim 7, wherein verifying a transaction while primary electrical power is lost and wired Internet connectivity is lost comprises receiving a verification from an external verification system.

13. The method of claim 7, wherein the transaction is a credit card payment.

14. A system, comprising:
    a network switch to provide electrical power conforming to Power over Ethernet (PoE) standards through a network connection to one or more devices employed to perform a transaction;
    a backup power source to provide secondary electrical power to the network switch upon a loss of primary electrical power; and
    a wireless access point to provide wireless Internet connectivity sufficient to verify payment for the transaction to the network switch upon a loss of wired Internet connectivity,
    wherein the backup power source provides sufficient power for the network switch to provide sufficient Internet connectivity to verify payment for the transaction when there is a loss of primary electrical power and a loss of wired internet connectivity.

15. The system of claim 14, wherein the transaction is a credit card payment.

16. The system of claim 14, wherein the wireless access point communicates via one or more of a Wireless Metropolitan Area Network (WMAN) and a Wireless Wide Area Network (WWAN).

17. The system of claim 16, wherein the WMAN is a Worldwide Interoperability for Microwave Access (WiMAX) network.

18. The system of claim 14, wherein the wireless access point provides a reduced throughput sufficient to verify a payment for the transaction upon loss of primary electrical power and/or loss of wired internet connectivity.

19. The system of claim 14, further comprising a persistent data store to store data related to the transaction.

20. The system of claim 14, further comprising a control logic to detect one or more of, the loss of primary electrical power, and the loss of wired Internet connectivity, and to control the system to provide to the network switch one or more of, secondary electrical power, voice connectivity, and wireless Internet connectivity.

* * * * *

UNITED STATES PATENT AND TRADEMARK OFFICE
CERTIFICATE OF CORRECTION

| | | |
|---|---|---|
| PATENT NO. | : 9,030,923 B2 | Page 1 of 1 |
| APPLICATION NO. | : 13/522468 | |
| DATED | : May 12, 2015 | |
| INVENTOR(S) | : Lee B. Hinkle et al. | |

It is certified that error appears in the above-identified patent and that said Letters Patent is hereby corrected as shown below:

In the claims,

In column 7, line 34, in Claim 4, delete "to," and insert -- to --, therefor.

In column 7, line 36, in Claim 5, delete "system" and insert -- apparatus --, therefor.

In column 7, line 39, in Claim 6, delete "system" and insert -- apparatus --, therefor.

In column 8, line 14 approx., in Claim 11, delete "arrant" and insert -- amount --, therefor.

Signed and Sealed this
Ninth Day of February, 2016

Michelle K. Lee
*Director of the United States Patent and Trademark Office*